United States Patent [19]

Chu

[11] Patent Number: 5,327,683
[45] Date of Patent: Jul. 12, 1994

[54] MODULAR FRONT PANEL OF A COMPUTER HOUSING

[76] Inventor: Vincent Chu, 6F, No. 493, Chung-Cheng Rd.,, Hsin-Tien City, Taipei Hsien, Taiwan

[21] Appl. No.: 90,656
[22] Filed: Jul. 13, 1993
[51] Int. Cl.$^5$ ............................................. E06B 3/32
[52] U.S. Cl. ............................................. 49/463
[58] Field of Search ................. 49/463, 464, 465, 128; 312/265.6, 348.4; 40/653; 463/345, 375

[56] References Cited

U.S. PATENT DOCUMENTS

| | | | |
|---|---|---|---|
| 3,703,787 | 11/1972 | Gomez | 49/464 X |
| 3,915,530 | 10/1975 | Anderson et al. | 312/265.6 |
| 4,928,450 | 5/1990 | Rutledge | 52/202 |
| 5,176,435 | 1/1993 | Pipkens | 312/265.6 X |

Primary Examiner—Peter M. Cuomo
Assistant Examiner—Jerry Redman
Attorney, Agent, or Firm—Bell, Seltzer, Park & Gibson

[57] ABSTRACT

A modular front panel of a computer housing includes a one-piece panel frame and rectangular first and second wall units. The panel frame is formed as a rectangular looped frame which confines a rectangular opening. The first wall unit is received fittingly in a first portion of the rectangular opening. The second wall unit is formed with a number of function key openings and is received fittingly in a second portion of the rectangular opening. The first and second wall units are secured detachably to the panel frame in the first and second portions of the rectangular opening. The remaining portion of the rectangular opening is allocated for disk drives.

7 Claims, 4 Drawing Sheets

MODULAR FRONT PANEL OF A COMPUTER HOUSING

BACKGROUND OF THE INVENTION

Field of the Invention

The invention relates to a front panel of a computer housing, more particularly to a modular front panel of a computer housing.

2. Description of the Related Art

The appearance of the front panel of a computer housing is usually selected in accordance with the manufacturer's wishes. For example, the location, number and size of the disk drives installed may vary for each manufacturer, thereby resulting in differences in the appearances of the front panels of different brands of computer housings. Since the front panel of a conventional computer housing is a unitary molded piece, a new mold must be prepared whenever the design of a current front panel is to be modified. The new mold entails a relatively large cost and requires a relatively long period, typically forty-five days, to prepare the same. This can prevent immediate mass production of newly designed front panels. In order to satisfy more costumers, some manufacturers tend to produce computer housings which have front panels that differ in appearance. Since a specific mold is needed for each type of front panel, the manufacturing costs are increased while the production time is prolonged. Furthermore, a mold replacing step should be performed whenever fabrication of one type of front panel is to be interrupted in order to initiate fabrication of another type of front panel, thereby resulting in a great deal of inconvenience.

SUMMARY OF THE INVENTION

Therefore, the objective of the present invention is to provide a modular front panel of a computer housing which has an appearance that can be varied so as to suit the manufacturer's wishes.

Another objective of the present invention is to provide a modular front panel of a computer housing which is easy and economical to fabricate when compared to the prior art.

Still another objective of the present invention is to provide a modular front panel of a computer housing which is easy to assemble.

Accordingly, the modular front panel of the present invention is to be used in a computer housing and includes a one-piece panel frame and rectangular first and second wall units. The panel frame is formed as a rectangular looped frame which confines a rectangular opening. The first wall unit is received fittingly in a first portion of the rectangular opening. The second wall unit is formed with a number of function key openings and is received fittingly in a second portion of the rectangular opening. The first and second wall units are secured detachably to the panel frame in the first and second portions of the rectangular opening. The remaining portion of the rectangular opening is allocated for disk drives.

The panel frame has two horizontal inner side surfaces, and each of the first and second wall units has two horizontal edges which are in contact with a respective one of the inner side surfaces. A number of first retaining units is formed on each of the inner side surfaces. A second retaining unit is formed on each of the horizontal edges of the first wall unit and engages detachably a selected one of the first retaining units. A third retaining unit is formed on each of the horizontal edges of the second wall unit and engages detachably a selected one of the first retaining units.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
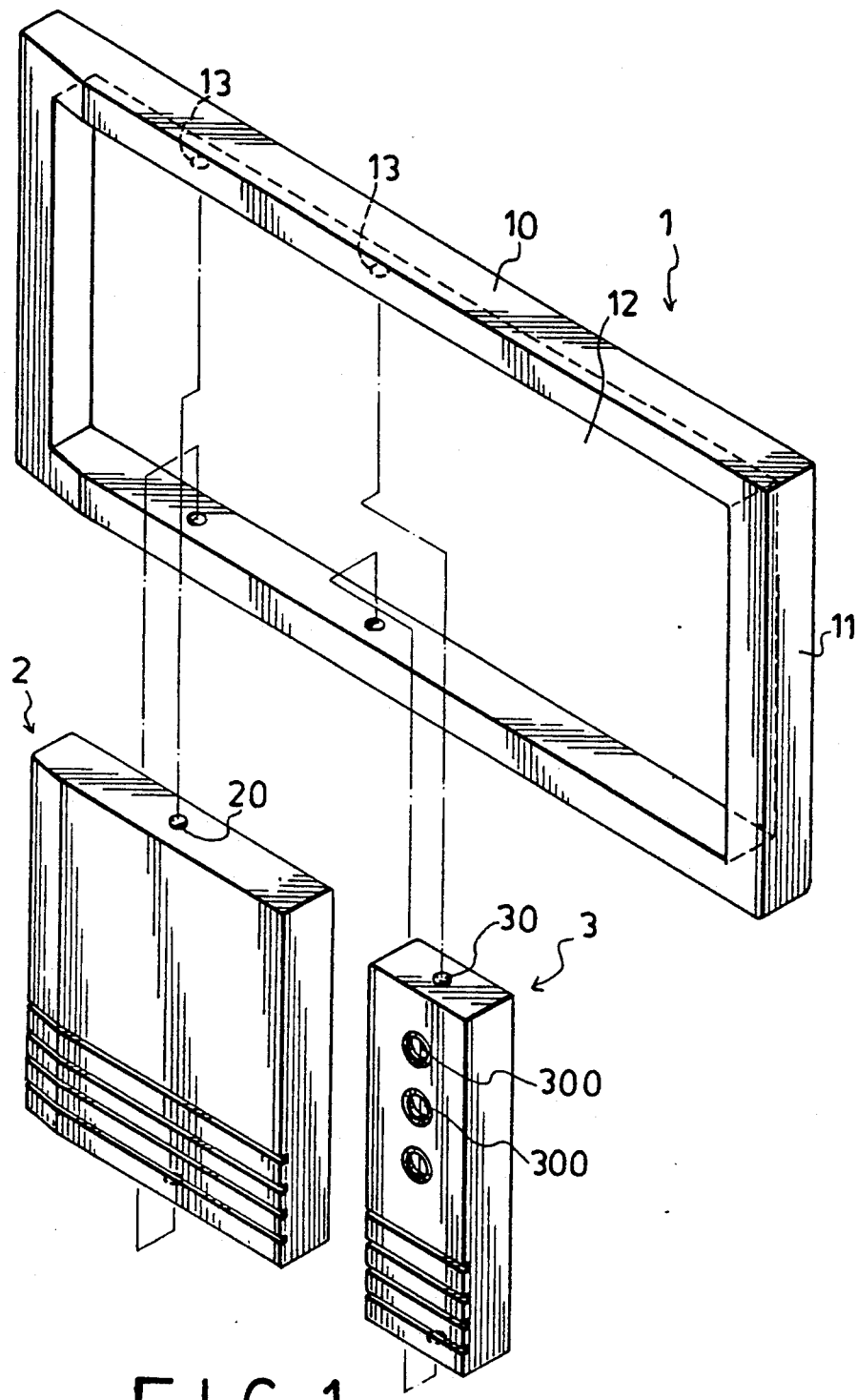
FIG. 1 is an exploded view of the first preferred embodiment of a modular front panel of a computer housing in accordance with the present invention.
Figure 2:
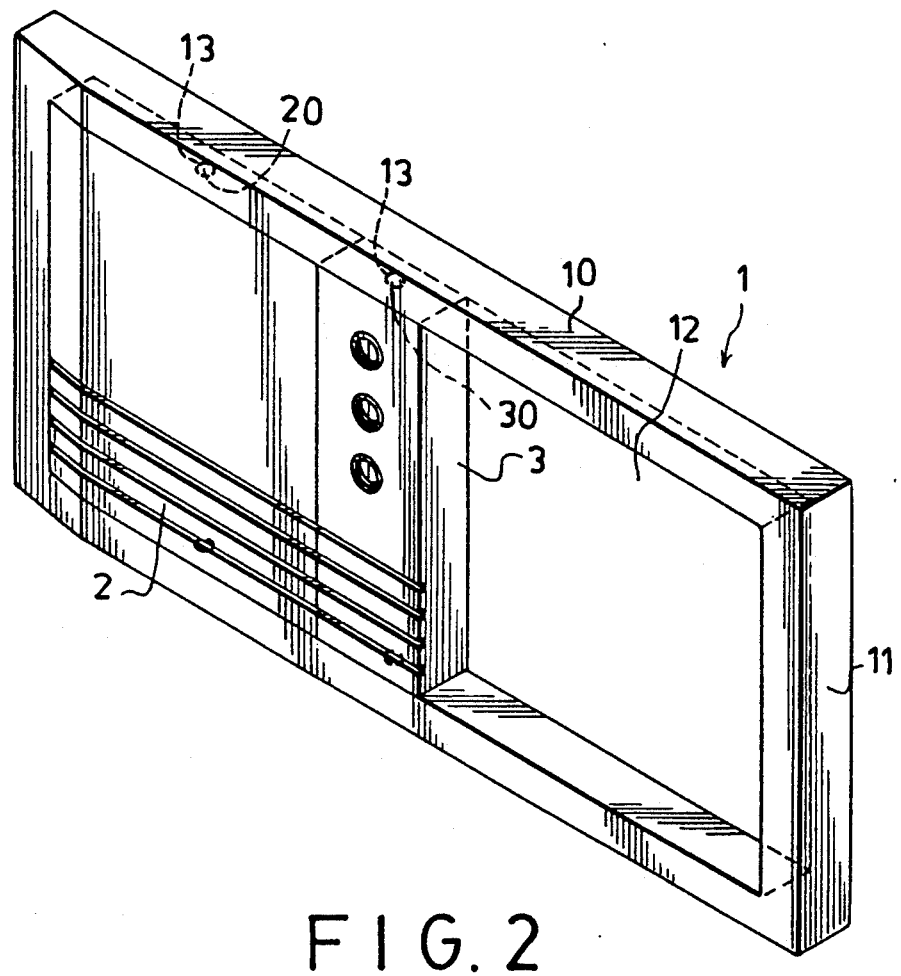
FIG. 2 is a perspective view of the first preferred embodiment.

Referring to FIGS. 1 and 2, the first preferred embodiment of a modular front panel of a computer housing in accordance with the present invention is shown to comprise a one-piece panel frame 1, a first wall unit 2 and a second wall unit 3.

The panel frame 1 includes two horizontal side bars 10 and two vertical side bars 11 which are interconnected to form a rectangular looped frame that confines a rectangular opening 12. Each of the horizontal side bars 10 has an inner side surface which is formed with a number of first retaining units 13. In this embodiment, the first retaining units 13 are retaining grooves.

The first wall unit 2 is a rectangular wall member and is fittingly received in a first portion of the rectangular opening 12 such that the horizontal edges of the first wall unit 2 are in contact with the inner side surface of a respective one of the horizontal side bars 10. Each of the horizontal edges of the first wall unit 2 is formed with a second retaining unit 20 that engages detachably a selected one of the first retaining units 13 in order to secure the first wall unit 2 to the panel frame 1 in the first portion of the rectangular opening 12. In this embodiment, the second retaining unit 20 is a retaining projection.

The second wall unit 3 is a rectangular wall member which is formed with a number of function key openings 300. The second wall unit 3 is fittingly received in a second portion of the rectangular opening 12 and is disposed adjacent to the first wall unit 2. The second wall unit 3 has horizontal edges that are in contact with the inner side surface of a respective one of the horizontal side bars 10. Each of the horizontal edges of the second wall unit 3 is formed with a third retaining unit 30 that engages detachably a selected one of the first retaining units 13 in order to secure the second wall unit 3 to the panel frame 1 in the second portion of the rectangular opening 12. In this embodiment, the third retaining unit 30 is a retaining projection.

Note that a third portion of the rectangular opening 12 is available after the first and second wall units 2, 3 have been secured to the panel frame 1 in order to form the modular front panel of the present invention. The third portion of the rectangular opening is allocated for disk drives (not shown).

Figure 3:
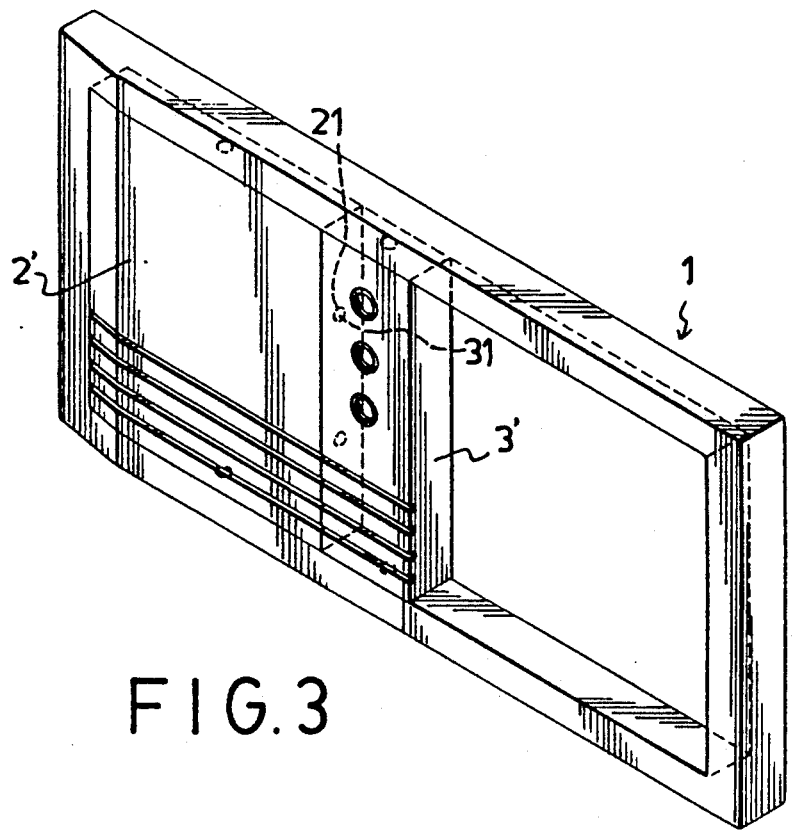
FIG. 3 is a perspective view of the second preferred embodiment of a modular front panel of a computer housing in accordance with the present invention.

The second preferred embodiment of a modular front panel according to the present invention is shown in FIG. 3. The first and second wall units 2', 3' have adjoining vertical edges which are respectively formed with fourth and fifth retaining units 21, 31. In this embodiment, the fourth retaining units 21 are retaining grooves, while the fifth retaining units 31 are retaining projections. The fifth retaining units 31 engage the fourth retaining units 21 in order to strengthen the connection among the first and second wall units 2', 3' and the panel frame 1

Figure 4:
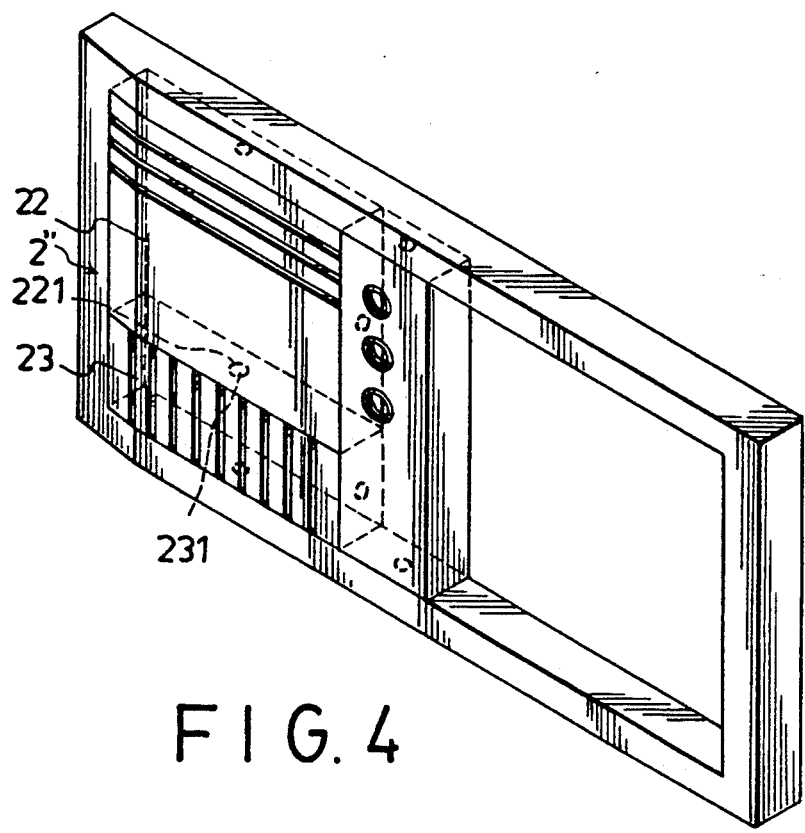
FIG. 4 is a perspective view of the third preferred embodiment of a modular front panel of a computer housing in accordance with the present invention.

The third preferred embodiment of a modular front panel according to the present invention is shown in FIG. 4. The first wall unit 2" includes first and second wall parts 22, 23 which have adjoining horizontal edges which are respectively formed with sixth and seventh retaining units 221, 231. The sixth and seventh retaining units 221, 231 are engaged to connect the first and second wall parts 22, 23. The first and second wall parts 22, 23 permit further variations in the appearance of the front panel so as to suit the manufacturer's wishes.

Figure 5:
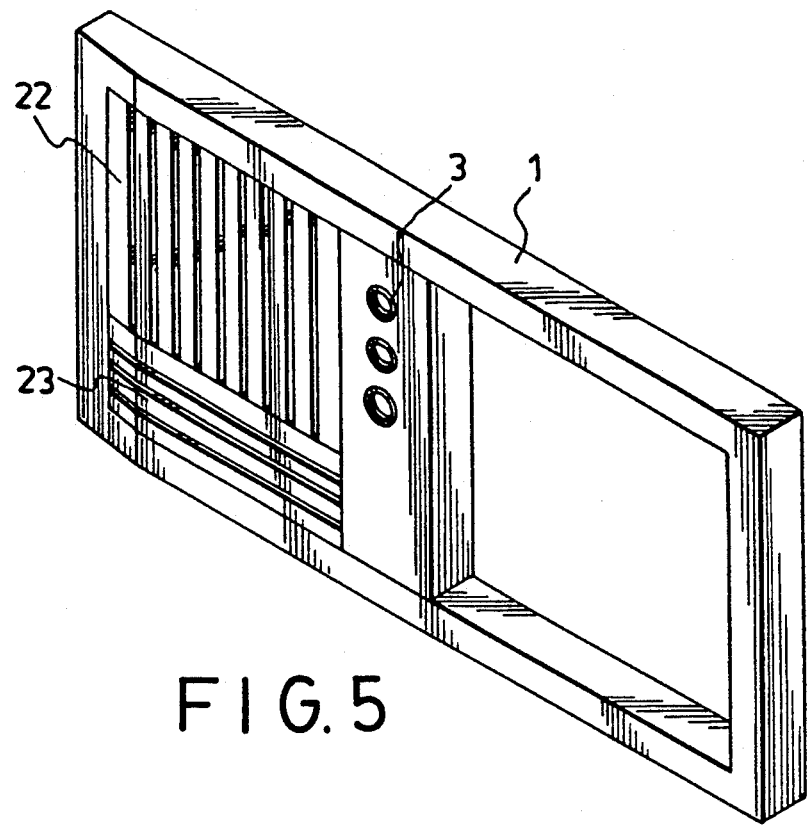
FIG. 5 is a perspective view of the fourth preferred embodiment of a modular front panel of a computer housing in accordance with the present invention.
Figure 6:
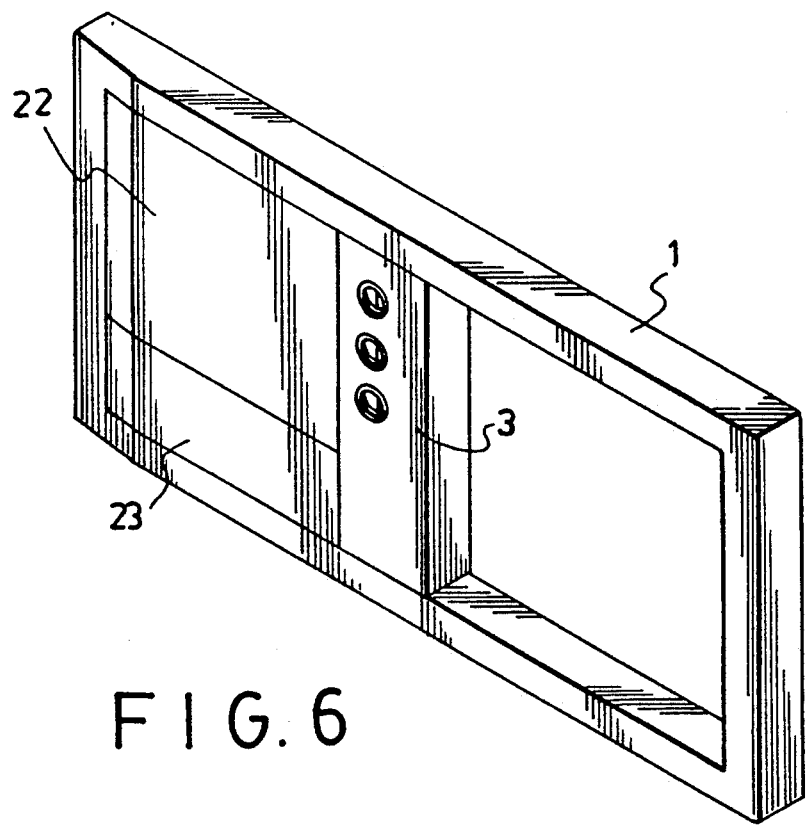
FIG. 6 is a perspective view of the fifth preferred embodiment of a modular front panel of a computer housing in accordance with the present invention.

Note that the front surfaces of the first and second wall parts 22, 23 may be decorated in accordance with the manufacturer's wants. For example, the front surfaces of the first and second wall parts 22, 23 may be respectively formed with vertically and horizontally extending decorative grooves, as shown in FIG. 5, or may be smooth and plain surfaces, as shown in FIG. 6. This illustrates how front panels that differ in appearance can be produced easily and conveniently.

It has thus been shown that by simply varying the arrangement of the first and second wall parts 22, 23 or the positions of the first and second wall units 2, 3 on the panel frame 1, different types of front panels can be produced without the need for preparing a new mold. A new mold is required only when it is desired to fabricate different second wall units 2 or different first and second wall parts 22, 23. This reduces considerably the costs incurred for the new mold, and facilitates immediate mass production of newly designed front panels. Moreover, the front panel of the present invention is easy to assemble due to the use of retaining projections and retaining grooves in attaching the first and second wall units 2, 3 onto the panel frame 1.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A modular front panel of a computer housing, comprising:
   a one-piece panel frame formed as a rectangular looped frame which confines a rectangular opening that includes first, second and third portions;
   a rectangular first wall unit fittingly received in said first portion of said rectangular opening;
   a rectangular second wall unit formed with a number of function key openings and fittingly received in said second portion of said rectangular opening; and
   a retaining means for securing detachably said first and second wall units to said panel frame in said first and second portions of said rectangular opening;
   whereby, said third portion of said rectangular opening is allocated for disk drives.

2. The modular front panel as claimed in claim 1, wherein said panel frame has two horizontal inner side surfaces and each of said first and second wall units has two horizontal edges which are in contact with a respective one of said inner side surfaces, said retaining means comprising:
   a number of first retaining units formed on each of said inner side surfaces;
   a second retaining unit being formed on each of said horizontal edges of said first wall unit and engaging detachably a selected one of said first retaining units; and
   a third retaining unit being formed on each of said horizontal edges of said second wall unit and engaging detachably a selected one of said first retaining units.

3. The modular front panel as claimed in claim 2, wherein one of said first retaining units and said second retaining unit is a retaining projection, and the other one of said first retaining units and said second retaining unit is a retaining groove that receives said retaining projection.

4. The modular front panel as claimed in claim 2, wherein one of said first retaining units and said third retaining unit is a retaining projection, and the other one of said first retaining units and said third retaining unit is a retaining groove that receives said retaining projection.

5. The modular front panel as claimed in claim 2, wherein said first and second wall units have adjoining vertical edges which are respectively formed with fourth and fifth retaining units that are engaged to connect said first and second wall units.

6. The modular front panel as claimed in claim 5, wherein one of said fourth and fifth retaining units is a retaining projection, and the other one of said fourth and fifth retaining units is a retaining groove that receives said retaining projection.

7. The modular front panel as claimed in claim 2, wherein said first wall unit includes first and second wall parts which have adjoining horizontal edges that are respectively formed with sixth and seventh retaining units, said sixth and seventh retaining units being engaged to connect said first and second wall parts.

* * * * *